(12) United States Patent
Yanagidate et al.

(10) Patent No.: US 12,281,673 B2
(45) Date of Patent: Apr. 22, 2025

(54) BEARING

(71) Applicant: Mitsubishi Electric Corporation, Tokyo (JP)

(72) Inventors: Naomichi Yanagidate, Tokyo (JP); Shinsaku Maeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 17/912,580

(22) PCT Filed: Apr. 20, 2020

(86) PCT No.: PCT/JP2020/016994
§ 371 (c)(1),
(2) Date: Sep. 19, 2022

(87) PCT Pub. No.: WO2021/214811
PCT Pub. Date: Oct. 28, 2021

(65) Prior Publication Data
US 2023/0160429 A1    May 25, 2023

(51) Int. Cl.
*F16C 33/37* (2006.01)
*F16C 19/20* (2006.01)
*F16C 19/40* (2006.01)

(52) U.S. Cl.
CPC .......... *F16C 33/3713* (2013.01); *F16C 19/20* (2013.01); *F16C 19/40* (2013.01)

(58) Field of Classification Search
CPC .......... F16C 19/20; F16C 19/26; F16C 19/40; F16C 19/507; F16C 33/37; F16C 33/3706; F16C 33/3713
See application file for complete search history.

(56) References Cited

U.S. PATENT DOCUMENTS

| | | | | |
|---|---|---|---|---|
| 2,120,533 | A | * | 6/1938 | Tillson .................. F16C 19/40 29/898.09 |
| 3,369,850 | A | * | 2/1968 | Irwin .................... F16C 33/605 384/553 |
| 3,411,839 | A | * | 11/1968 | Johnston ............... F16C 19/40 384/553 |

FOREIGN PATENT DOCUMENTS

| | | |
|---|---|---|
| JP | S3928823 B1 | 12/1964 |
| JP | 2000055044 A | 2/2000 |
| JP | 2003166529 A | 6/2003 |
| JP | 2008068817 A | 3/2008 |
| JP | 2010133559 A | 6/2010 |

(Continued)

OTHER PUBLICATIONS

International Search Report (PCT/ISA/210) with translation and Written Opinion (PCT/ISA/237) mailed on Jul. 7, 2020, by the Japan Patent Office as the International Searching Authority for International Application No. PCT/JP2020/016994. (9 pages).

(Continued)

*Primary Examiner* — James Pilkington
(74) *Attorney, Agent, or Firm* — Buchanan Ingersoll & Rooney PC (57) ABSTRACT

An outer ring case includes an annular guide groove housing an end of each of a plurality of inner rollers. A groove width representing a radial length of the guide groove is greater than a diameter of each inner roller. A radius representing a distance from a bearing axis to an inner wall face of the guide groove that is radially outer is smaller than a distance from the bearing axis to an axial center of each of rollers plus a radius of each inner roller.

16 Claims, 11 Drawing Sheets

(56) References Cited

FOREIGN PATENT DOCUMENTS

| | | |
|---|---|---|
| JP | 2016111801 A | 6/2016 |
| JP | 2018003687 A | 1/2018 |

OTHER PUBLICATIONS

Notice of Reasons for Refusal of Japanese Patent Application No. 2020-558655 mailed Jan. 19, 2021 (with Machine Translation). (10 pages).

* cited by examiner

BEARING

FIELD

The present disclosure relates to a bearing that uses two types of rollers with different diameters.

BACKGROUND

A proposed bearing uses two types of rollers with different diameters, thus eliminating a cage that holds rollers. A plurality of larger diameter rollers in Patent Literature 1 are cylindrical rollers arranged between a radially inner ring member and a radially outer ring member, and smaller diameter rollers that are shaft-shaped rollers and are smaller in diameter than the larger diameter rollers are each arranged between the larger diameter rollers. An annular groove in the radially outer ring member allows the smaller diameter rollers to be radially movable.

CITATION LIST

Patent Literature

Patent Literature 1: Japanese Patent Application Laid-open No. 2000-55044

SUMMARY

Technical Problem

Patent Literature 1 provides no disclosures regarding a radial position and a radial width of the groove in which the smaller diameter rollers are arranged, and the smaller diameter rollers in the groove may move to a space on a radially outer side of center positions of the larger diameter rollers. Therefore, there is a concern about damage to the larger diameter rollers due to increased rolling resistance from contact between the larger diameter rollers. Moreover, the smaller diameter rollers can collide with an inner wall of the groove that is radially outer and thus may be damaged or broken.

The present disclosure has been made in view of the above, and an object of the present disclosure is to obtain a bearing that can prevent smaller diameter rollers from moving to a radially outer space beyond the axial centers of larger diameter rollers, thus preventing damage to the smaller diameter and larger diameter rollers and enabling reduction of power loss.

Solution to Problem

In order to solve the above-stated problems and achieve the object, a bearing according to the present disclosure includes: an inner ring case; an outer ring case disposed around the inner ring case; a plurality of first rollers that roll between an outer periphery of the inner ring case and an inner periphery of the outer ring case; and a plurality of second rollers each of which is disposed between adjacent first rollers. Each of the second rollers: is smaller in diameter than each of the first rollers; and has a longer axial length along a rotation axis than each of the first rollers. The outer ring case includes an annular guide groove housing an end of each of the plurality of second rollers, with the rotation axis of each of the second rollers being perpendicular to a radial direction and a circumferential direction of the bearing. A groove width representing a length of the guide groove along the radial direction of the bearing is greater than a diameter of each of the second rollers. A first radius representing a distance from a bearing axis to an inner wall face of the guide groove that is outer in the radial direction of the bearing is smaller than a distance from the bearing axis to an axial center of each of the first rollers plus a radius of each of the second rollers.

Advantageous Effects of Invention

According to the present disclosure, the second rollers can be prevented from entering into radially outer space beyond the axial centers of the first rollers. Therefore, damage to the first and second rollers is preventable, and power loss due to contact between the first rollers can be reduced.

DESCRIPTION OF EMBODIMENTS

With reference to the drawings, a detailed description is hereinafter provided of bearings according to embodiments. It is to be noted that these embodiments are not restrictive of the present disclosure.

First Embodiment

Figure 1:
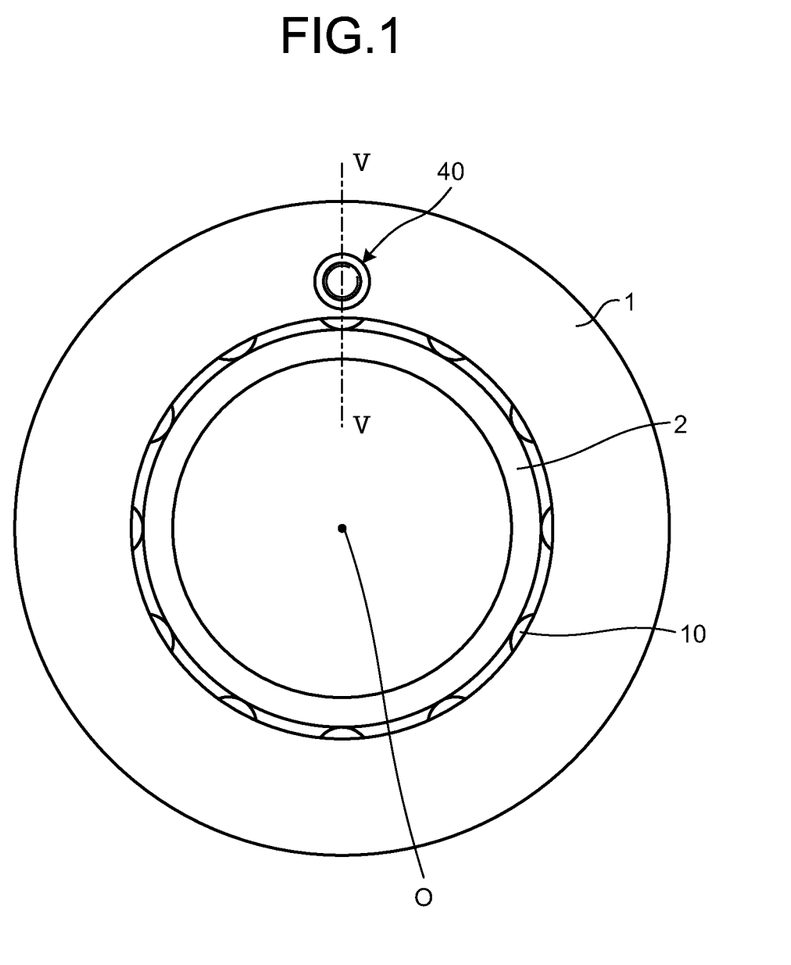
FIG. 1 is a front view of a bearing according to a first embodiment.
Figure 2:
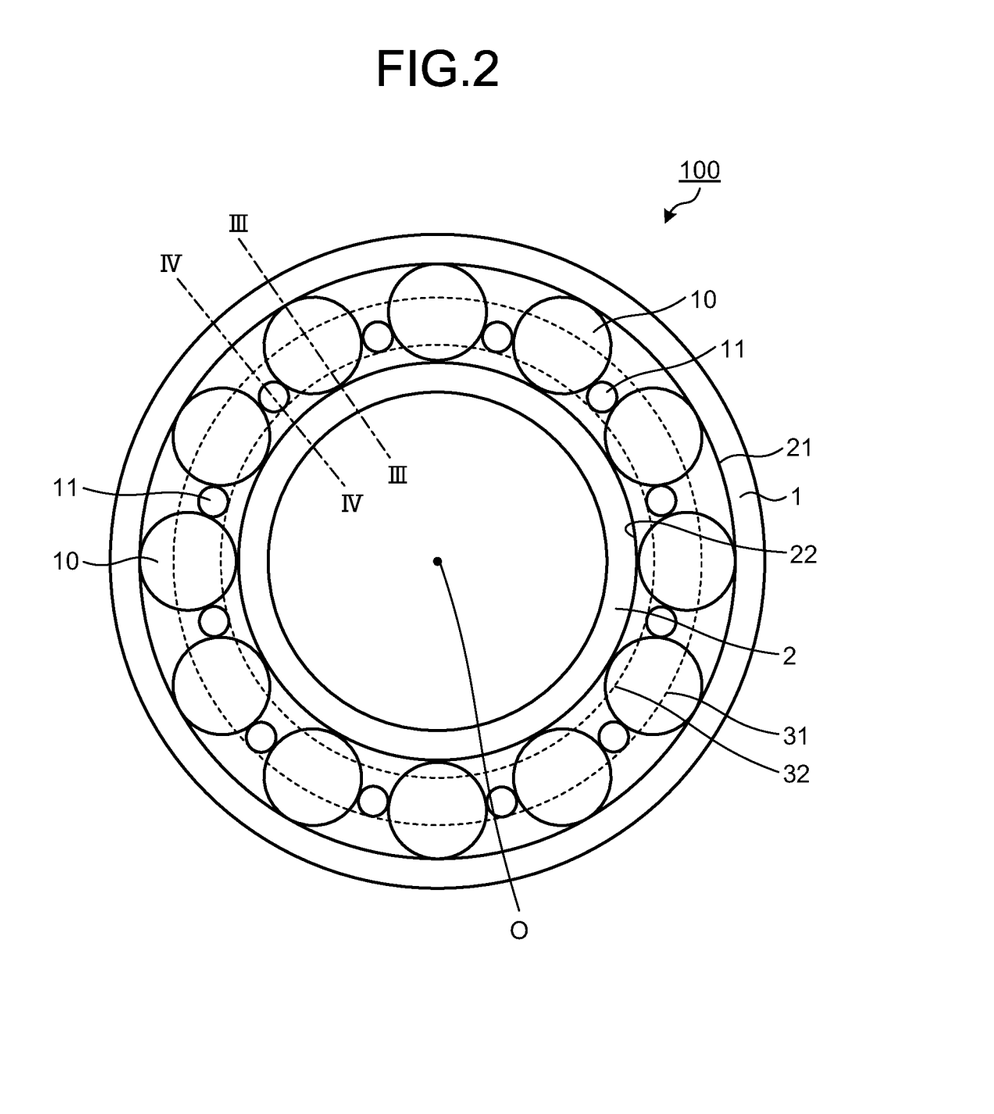
FIG. 2 illustrates a cross section of the bearing according to the first embodiment.
Figure 3:
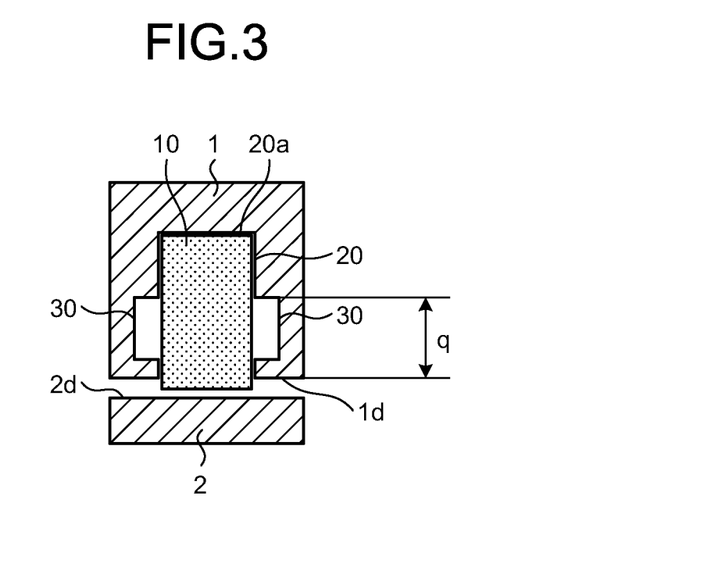
FIG. 3 is a diagram illustrating a section along line III-III of FIG. 2.
Figure 4:
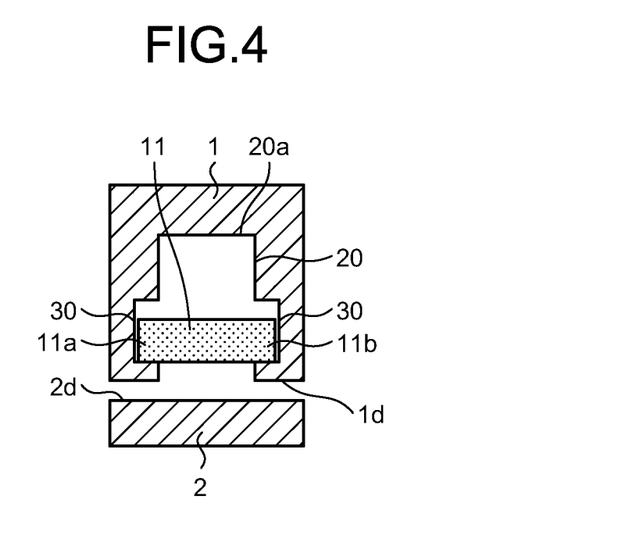
FIG. 4 is a diagram illustrating a section along line IV-IV of FIG. 2.
Figure 5:
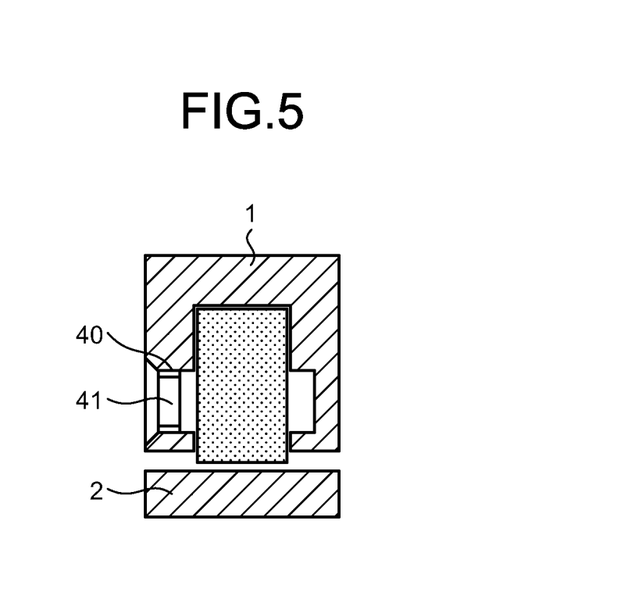
FIG. 5 is a diagram illustrating a section along line V-V of FIG. 1.
Figure 6:
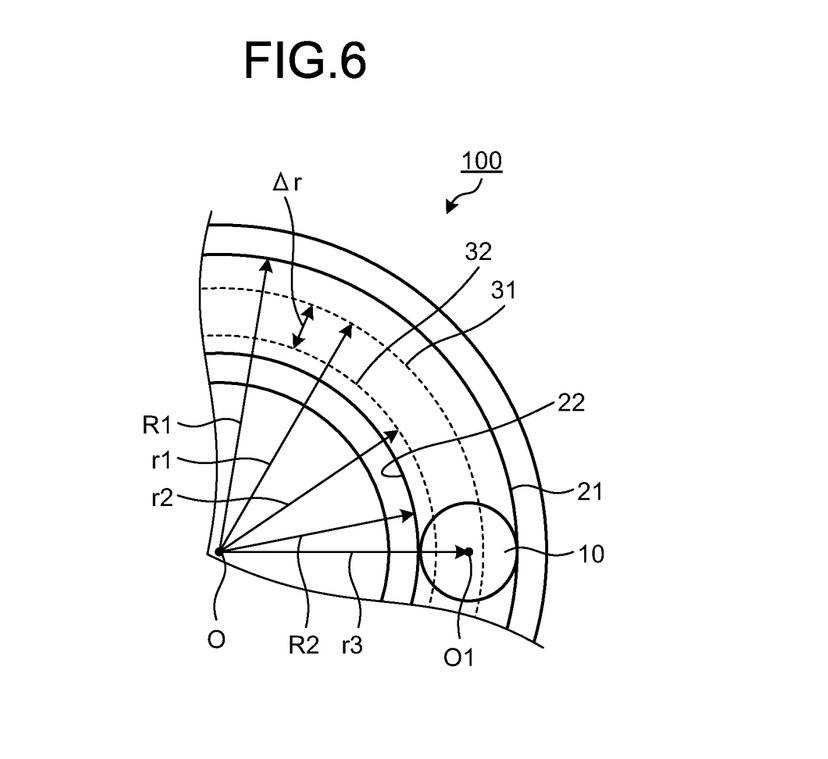
FIG. 6 is a diagram illustrating where radii of parts of the bearing according to the first embodiment are located.
Figure 7:
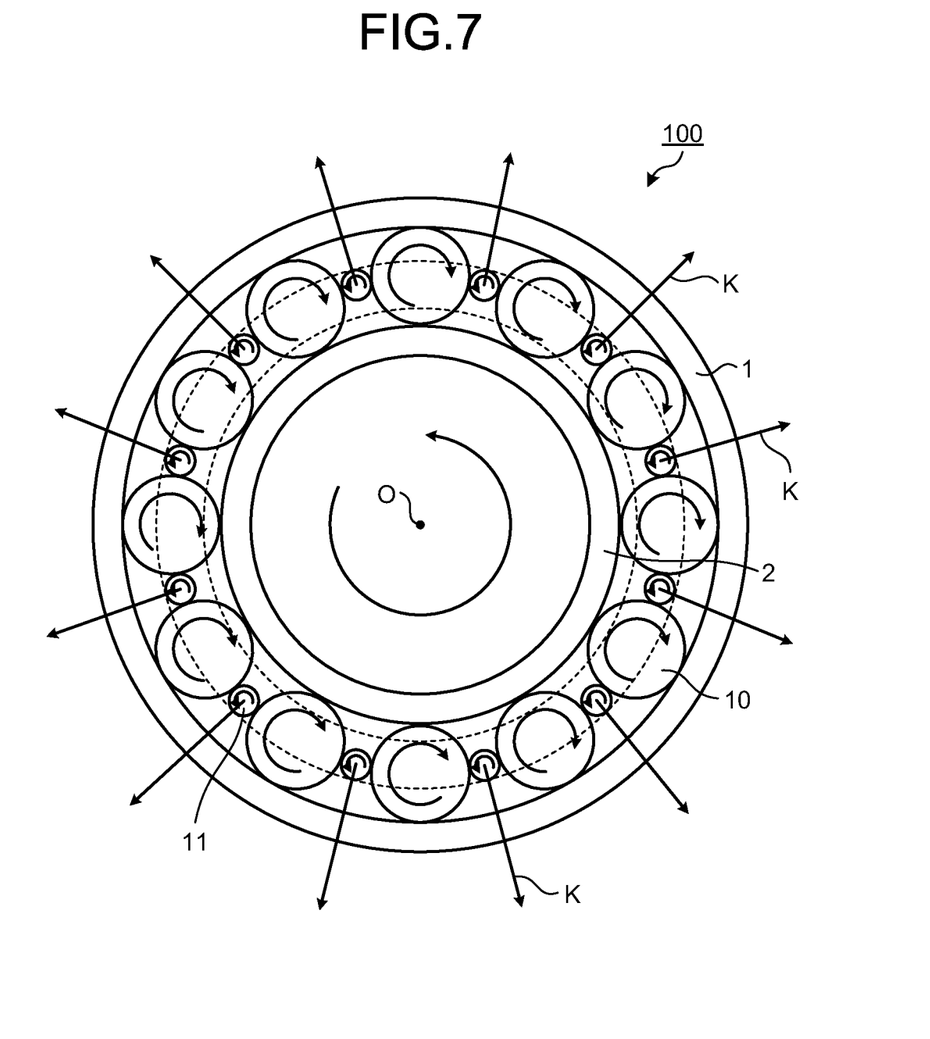
FIG. 7 is a diagram illustrating a state in which inner rollers are in contact with rollers during higher speed rotation of the bearing according to the first embodiment.

Using FIGS. 1 to 7, a description is provided of a bearing according to a first embodiment. FIG. 1 is a front view of the bearing according to the first embodiment. FIG. 2 is a cross section of the bearing illustrated in FIG. 1 taken on a plane perpendicular to a bearing axis O, illustrating a state of lower speed rotation. FIG. 3 is a diagram illustrating a section along line III-III of FIG. 2. FIG. 4 is a diagram illustrating a section along line IV-IV of FIG. 2. FIG. 5 is a diagram illustrating a section along line V-V of FIG. 1. FIG. 6 is a diagram illustrating where radii of parts are. FIG. 7 is a cross section of the bearing illustrated in FIG. 1 taken on a plane perpendicular the bearing axis O, illustrating a state of higher speed rotation.

The bearing 100 in FIGS. 1 to 5 includes: an outer ring case 1; an inner ring case 2 disposed at inner side of the outer ring case 1; a plurality of rollers 10 as larger diameter rollers, and a plurality of inner rollers 11 that are smaller in diameter than the rollers 10. Each of the rollers 10 has a radius "a". Each of the inner rollers 11 has a radius "b", and a>b. The rollers 10 correspond to first rollers in the claims, and the inner rollers 11 correspond to second rollers in the claims.

As illustrated in FIGS. 2 and 3, each of the plurality of rollers 10 has a cylindrical shape having, at its center, a rotation axis parallel to the bearing axis O. As illustrated in FIGS. 2 and 4, each of the inner rollers 11 has a cylindrical shape having, at its center, a rotation axis parallel to the bearing axis O. An axial length of each inner roller 11 along the rotation axis is longer than an axial length of each roller 10 along the rotation axis. The inner rollers 11 are rod-shaped. Each inner roller 11 is disposed between the adjacent rollers 10.

The outer ring case 1 is annular and includes an internal space for housing the plurality of rollers 10 and the plurality of inner rollers 11. The inner ring case 2 is also annular.

As illustrated in FIGS. 3 to 5, the outer ring case 1 includes an annular guide groove 20 that houses some of the plurality of rollers 10. The guide groove 20 is a recess heading outward in a radial direction of the bearing 100. An arc 21 in FIGS. 2 and 6 corresponds to a position of a bottom 20a of the guide groove 20 illustrated in FIG. 3. As illustrated in FIG. 6, the arc 21 has a radius R1 extending from the bearing axis O. An arc 22 corresponds to a position of an outer periphery 2d of the inner ring case 2. As illustrated in FIG. 6, the arc 22 has a radius R2 extending from the bearing axis O.

The rollers 10 are in contact with the bottom 20a of the guide groove 20 (i.e., the arc 21) and the outer periphery 2d of the inner ring case 2 (i.e., the arc 22). In other words, the radius R2 plus a diameter 2×a of the roller 10 equals the radius R1. Each roller 10 rotates on its rotation axis with its circumferential face in contact with the arcs 21 and 22. Each roller 10 also orbits around the bearing axis O with its circumferential face in contact with the arcs 21 and 22.

As illustrated in FIGS. 3, 4, and 5, the outer ring case 1 includes a pair of annular guide grooves 30 as second guide grooves housing axial ends 11a and 11b of each of the plurality of inner rollers 11. The guide grooves 30 are recesses along the bearing axis O. In FIGS. 2 and 6, an arc 31 corresponds to a position of the inner wall faces of the guide grooves 30 of the outer periphery-side. As illustrated in FIG. 6, the arc 31 has a radius r1 extending from the bearing axis O. An arc 32 corresponds to a position of the inner wall faces of the guide grooves 30 of the inner periphery-side. As illustrated in FIG. 6, the arc 32 has a radius r2 extending from the bearing axis O. The arc 31 is hereinafter referred to as an outer periphery of the guide grooves 30, and the arc 32 is hereinafter referred to as an inner periphery of the guide grooves 30.

As illustrated in FIG. 6, each of the guide grooves 30 has a radial groove width Δr that equals a value radius r1 minus the radius r2. The groove width Δr of each guide groove 30 is greater than a diameter (2×b) of the inner roller 11. In other words, the radius r2 plus the diameter (2×b) of the inner roller 11 is smaller than the radius r1. For this reason, the inner rollers 11 are radially movable in the guide grooves 30.

A detailed description is provided here of the positions of the outer and inner peripheries 31 and 32 of the guide grooves 30. The radius r1, being a position of the outer periphery 31 of the guide grooves 30, is set to a value smaller than a distance r3 (refer to FIG. 6), which is a distance from the bearing axis O to an axial center O1 of the roller 10, plus the radius "b" of the inner roller 11. The distance r3 equals the radius R2 plus the radius "a" of the roller 10. In other words, the outer periphery 31 of the guide grooves 30 restricts the movement of the inner rollers 11 so that an axial center of the inner roller 11 does not come to a radially outer position compared with the axial center O1 of the roller 10. This restriction by the outer periphery 31 prevents, unlike the Patent Literature 1, entry of the inner roller 11 into a radially outer space beyond the axial center O1 of the roller 10.

The radius r2, being a position of the inner periphery 32 of the guide grooves 30, is set to a value smaller than a value of the radius r1 minus the diameter 2×b of the inner roller 11 so as to locate a radially inner position. The r1 is the position of the outer periphery 31 of the guide grooves 30. Moreover, the radius r2, being the position of the inner periphery 32 of the guide grooves 30, is set to a value greater than the radius r1 minus a distance "q" (refer to FIG. 3). The distance "q" is a distance between the r1 and 1d which is an external face of the outer ring case 1 closer to the inner ring case 2. That is, the radius r2 is set to a position outer periphery side than the 1d.

As illustrated in FIGS. 1 and 5, the outer ring case 1 includes a tapped hole 40 connecting with the guide groove 30. The inner rollers 11 can be inserted through the tapped hole 40. After the inner rollers 11 are inserted through the tapped hole 40 during manufacture, a screw 41 is inserted in the tapped hole 40 to close the tapped hole 40. The tapped hole 40 in FIG. 5 includes a taper portion into which a head of the screw 41 fits. It is to be noted, however, that the screw 41 has an adjusted length and that a leading end of the screw 41 has an adjusted shape, adjusted surface roughness, and adjusted flatness. This is for the purpose of preventing the inserted screw 41 from forming a step where the screw 41 contacts with the guide groove 30 and interfering with the inner rollers 11. The tapped hole 40 in FIG. 1 is provided only in one of sides of the outer ring case 1; however, the tapped hole 40 may be formed in each of the sides of the outer ring case 1. Another alternative is that a plurality of intermittent tapped holes may be formed along a periphery of the outer ring case 1. With the tapped hole 40, which is used for the insertion of the inner rollers 11, and the screw 41 in the outer ring case 1, the bearing 100 is easy to assemble.

A description is provided next of how the bearing 100 operates. As illustrated in FIG. 7, when the inner ring case 2 rotates, each roller 10 rotates on its own axis. Each roller 10 also orbits for minimizing rolling resistance with the outer ring case 1. Each inner roller 11 in contact with the rollers 10 rotates on its own axis in a direction opposite to that of the rollers 10 and orbits in an orbiting direction of each roller 10 having a larger mass.

In a nonrotating state or during the lower speed rotation, as illustrated in FIG. 2, each inner roller 11 is in contact: with the inner periphery 32 or the outer periphery 31 of the guide grooves 30 in accordance with gravity; and with the roller 10 on each side. On the other hand, during the higher speed rotation, centrifugal force K acts on each inner roller 11, as illustrated in FIG. 7. Here the rollers 10 and the inner rollers 11 operate so as to minimize energy loss, in a state every inner roller 11 is in contact with only the adjacent rollers 10, and in a state all the inner rollers 11 orbiting equidistantly from the bearing axis O. Thus, during the higher speed rotation, each inner roller 11 rotates on its own axis and orbits while contacting only the adjacent rollers 10 and not contacting with the outer periphery 31 and the inner periphery 32 of the guide grooves 30.

A bearing with an inside diameter of about 70 mm, such as a railroad bearing, rotates at higher speeds as described above for a majority of operating time. For example, when as in the railroad bearing, the inside diameter is 70 mm, the inner ring case 2 has a thickness of 7.75 mm, an outside diameter is 125 mm, and each roller 10 has a diameter of 12 mm and a length of 15 mm, the inner rollers 11 move radially outward at an orbital speed of 15.14 rad/s or more, that is to say, 2.410 rps (144.58 rpm) or more due to the centrifugal force. The inner rollers 11 move at the same orbital speed as the rollers 10. Therefore, the orbital speed of the inner rollers 11 becomes 144.58 rpm when a motor rotates at a speed of 1076.5 rpm or more. Since a maximum rotation speed of a railroad motor ranges from 3500 rpm to about 4000 rpm and, for Shinkansen bullet trains, 5000 rpm to 6500 rpm, each inner roller 11 is obviously possible to be in a state of contact with only the rollers 10 due to the centrifugal force that acts on each inner roller 11.

Figure 8:
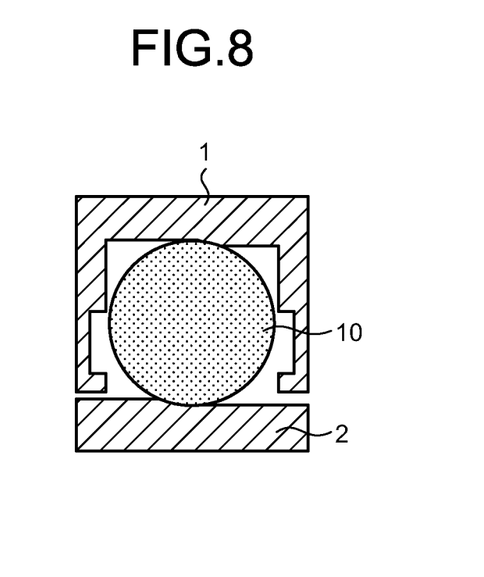
FIG. 8 is a diagram illustrating a roller having another shape.
Figure 9:
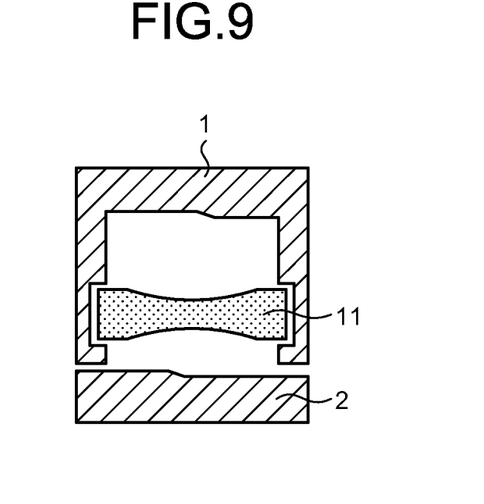
FIG. 9 is a diagram illustrating an inner roller having another shape.

While the rollers 10 and the inner rollers 11 are cylindrical in the above description, the rollers 10 may be spherical, as illustrated in FIG. 8. FIG. 8 illustrates a section along line III-III of FIG. 2. As illustrated in FIG. 9, each inner roller 11 may adopt the shape of a rod having a neck such that a middle part is smaller in diameter than each end of the rod. FIG. 9 illustrates a section along line IV-IV of FIG. 2.

According to the first embodiment described above, the outer periphery 31 of the guide grooves 30 restricts the movement of the inner rollers 11 so as to prevent the axial center of each inner roller 11 that radially aligns with the axial center O1 of the roller 10 from coming to the radially outer position. This prevents, unlike Patent Literature 1, each inner roller 11 from entering into the radially outer space beyond the axial center O1 of the roller 10. Therefore, damage to the rollers 10 and the inner rollers 11 is preventable, and power loss due to contact between the rollers 10 is reduced. With the tapped hole 40, which is used for the insertion of the inner rollers 11, in the outer ring case 1, the bearing 100 is easy to assemble.

Second Embodiment

Figure 10:
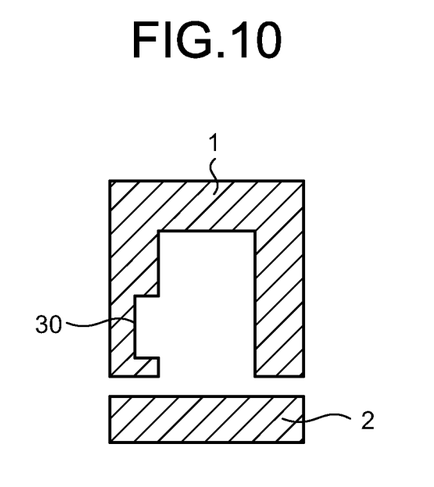
FIG. 10 is a sectional view of a bearing according to a second embodiment.

Using FIG. 10, a description is provided of a configuration of the bearing 100 according to a second embodiment. FIG. 10 illustrates a section along each of lines III-III and IV-IV of FIG. 2. In the second embodiment, only one of the guide grooves 30 is provided to house one of the axial ends 11a and 11b (refer to FIG. 4) of each of the inner rollers 11. The configuration is otherwise similar to that of the first embodiment.

Third Embodiment

Figure 11:
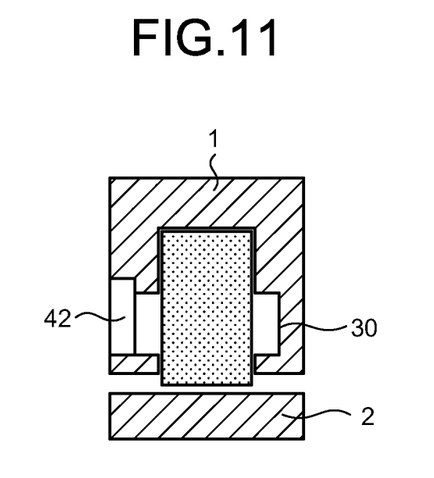
FIG. 11 is a sectional view of a bearing according to a third embodiment.

Using FIG. 11, a description is provided of a configuration of the bearing 100 according to a third embodiment. FIG. 11 illustrates a section along line V-V of FIG. 1. In the third embodiment, not the tapped hole 40 but a hole 42 that is not threaded is formed in the outer ring case 1. The hole 42 may include a tapered face to facilitate the insertion of the inner rollers 11.

Fourth Embodiment

Figure 12:
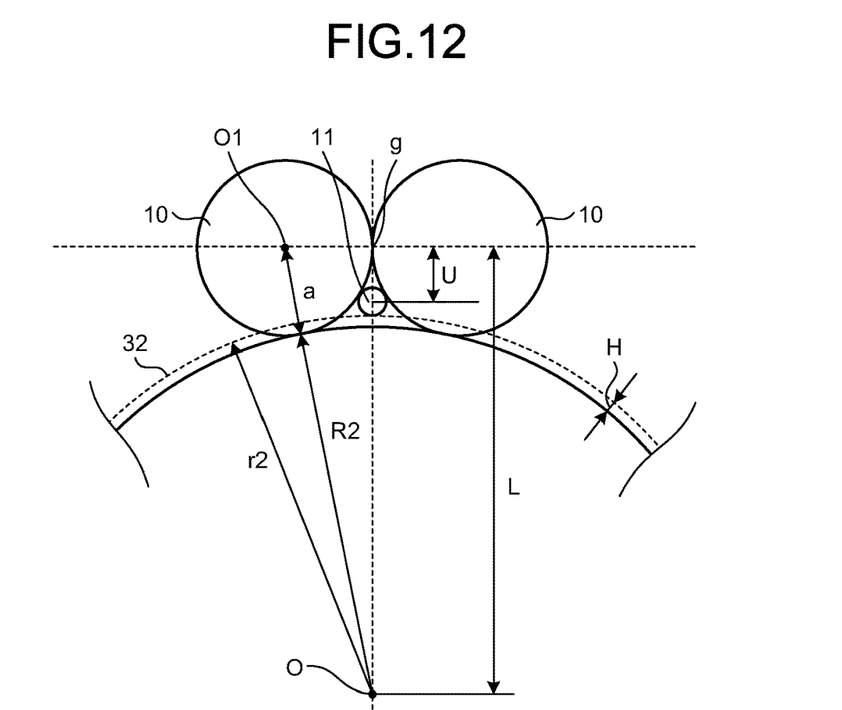
FIG. 12 is a diagram used for describing a bearing according to a fourth embodiment.

A description in the fourth embodiment is provided of the radius "b" of each inner roller 11 that prevents the rollers 10 from contacting with one another. FIG. 12 illustrates a state in which the rollers 10 are in contact with each other, with the inner roller 11 contacting the rollers 10. Let L be a distance between a contact point "g" at which the rollers 10 contact with each other and the bearing axis O. Let R2 be a distance from the bearing axis O to the outer periphery of the inner ring case 2, with each roller 10 having the radius "a". The distance L can be determined as follows with the Pythagorean theorem.

$$L=\sqrt{((R2+a)^2-a^2)}$$

Let H be a distance between the groove width 2 that corresponds to the position indicated by the radius R2 and the inner periphery 32 of the guide groove 30. A distance U between a center of the inner roller 11 and the contact point g at which the rollers 10 contact each other can be determined using a formula below.

$$U=L-(R2+H)-b$$

The radius "b" of the inner roller 11 can be determined from a triangle connecting the axial center O1 of the roller 10, the center of the inner roller 11, and the contact point g between the rollers 10. The radius "b" of the inner roller 11 needs to be great compared to the state illustrated in FIG. 12 and thus satisfies a formula below.

$$b>(L^2+(R2+H)^2-2L(R2+H))/2(a+L-R2-H)$$

Figure 13:
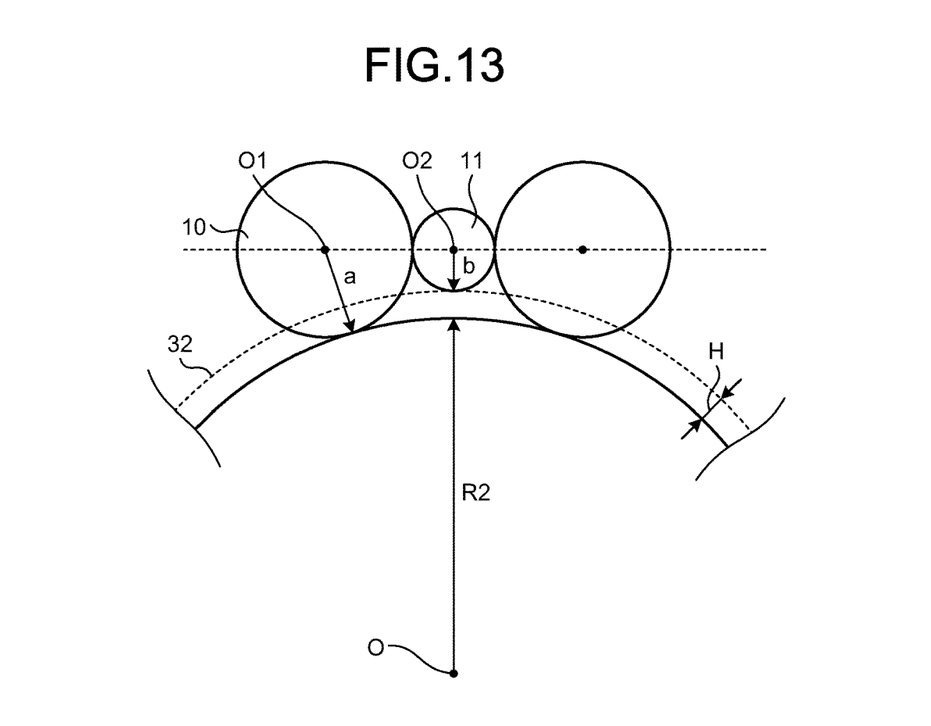
FIG. 13 is a diagram used for describing the bearing according to the fourth embodiment.

A relationship illustrated in FIG. 13 between the inner roller 11 and the rollers 10 is such that a triangle O1-O2-O formed by three points that are the center O1 of the roller 10, the center O2 of the inner roller 11, and the bearing axis O is a right triangle. When an angle at the vertex O of the triangle O1-O2-O is θ1 with the inner rollers 11 being "n" in number, the angle θ1 can be expressed in a formula below. It is to be noted that "n" is an integer greater than or equal to 3.

$$2\theta1 \leq 2\pi \leq 2\theta1 \times (n+1)$$

wherein $$\theta1=\arccos((b+H+R2)/(a+R2))$$

On the basis of these relations, the radius "b" of the inner roller 11 can take a maximum of $b \leq (a+R2)\cos(\pi/n)-(H+R2)$.

Based on the above relations, the radius "b" of the inner roller 11 satisfies Formula (1) below.

$$(L_2+(R2+H)_2-2L(R2+H))/2(a+L-R2-H)<b \leq (a+R2)\cos(\pi/n)-(H+R2) \quad (1)$$

In the fourth embodiment, a radius (b) range of the inner roller 11 for preventing the rollers 10 from contacting each other is identifiable with Formula (1). Since the contact between the rollers 10 is prevented thus, strength against transient force (impact) is improved.

Fifth Embodiment

Figure 14:
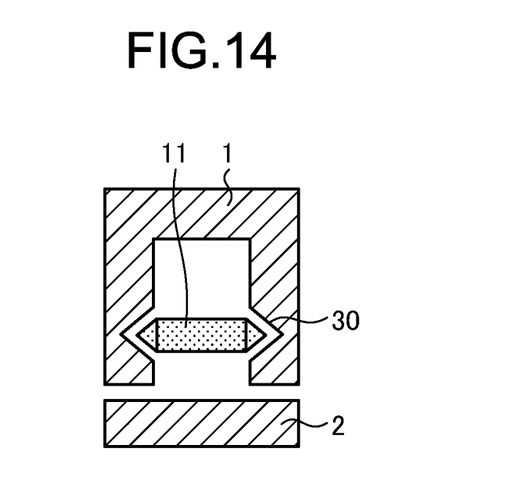
FIG. 14 is a diagram illustrating a bearing according to a fifth embodiment.
Figure 15:
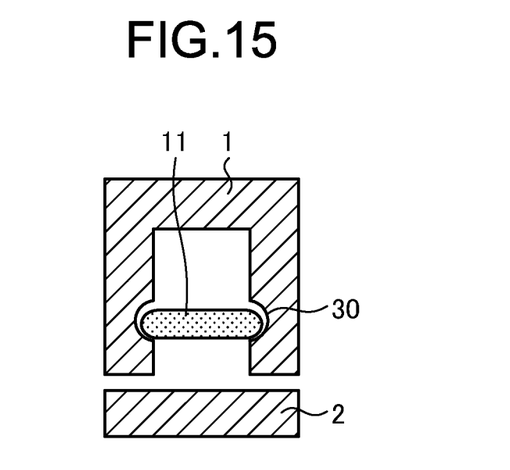
FIG. 15 is a diagram illustrating a bearing according to the fifth embodiment.
Figure 16:
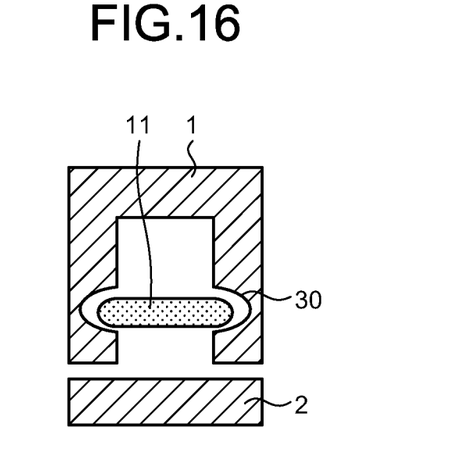
FIG. 16 is a diagram illustrating a bearing according to the fifth embodiment.
Figure 17:
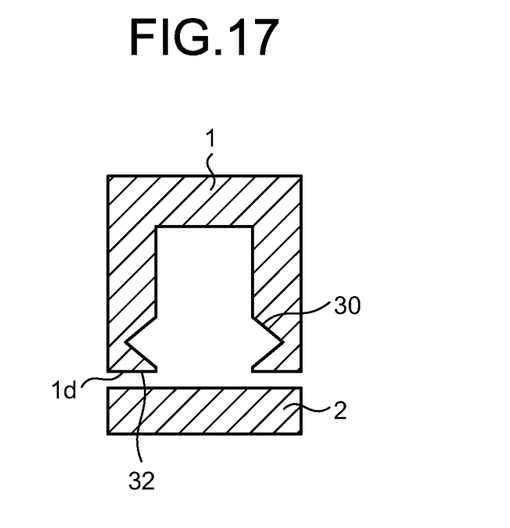
FIG. 17 is a diagram illustrating a bearing according to the fifth embodiment.
Figure 18:
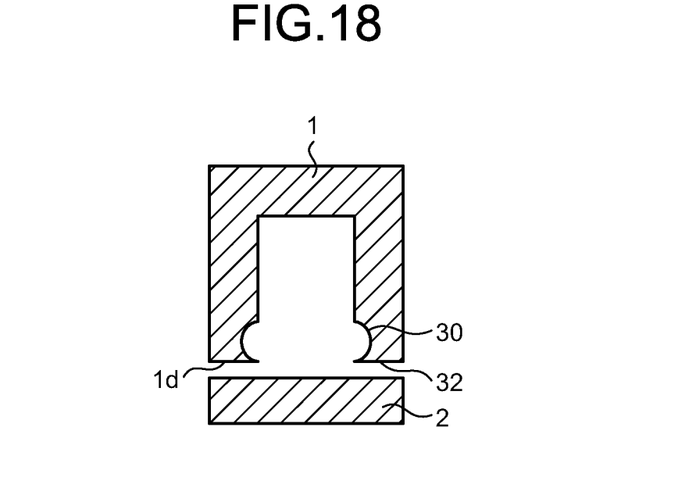
FIG. 18 is a diagram illustrating a bearing according to the fifth embodiment.
Figure 19:
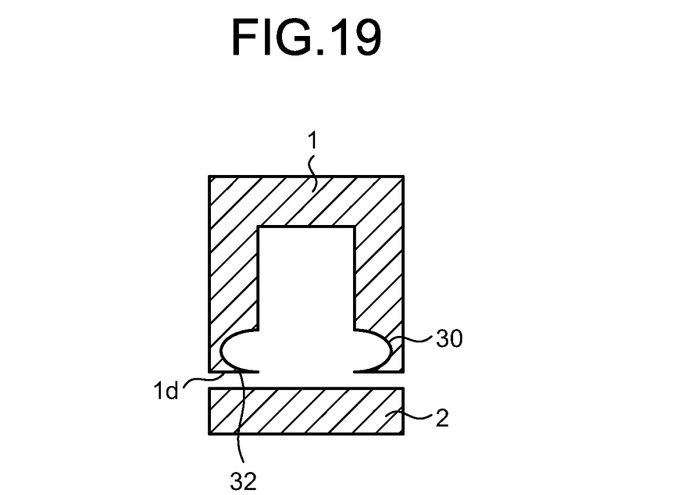
FIG. 19 is a diagram illustrating a bearing according to the fifth embodiment.

Although a section of each guide groove 30 that faces in a circumferential direction has the shape of a quadrangle in the first embodiment, another shape may be adopted. In FIG. 14, the guide groove 30 has a triangular section that faces in the circumferential direction, and the inner roller 11 has triangular ends. In FIG. 15, the guide groove 30 has a semicircular section that faces in the circumferential direction, and the inner roller 11 has semicircular ends. In FIG. 16, the guide groove 30 has a semielliptical section that faces in the circumferential direction, and the inner roller 11 has semielliptical ends. The section of the guide groove 30 that faces in the circumferential direction and the ends of the inner roller 11 may each have the shape of a combination of a quadrangle, a triangle, a semicircle, and a semiellipse. As illustrated in each of FIGS. 17 to 19, the inner periphery 32 of the guide grooves 30 may coincide with the external face 1d of the outer ring case 1 that is closer to the inner ring case 2. In FIG. 17, the guide groove 30 has a triangular section that faces in the circumferential direction. In FIG. 18, the guide groove 30 has a semicircular section that faces in the circumferential direction. In FIG. 19, the guide groove 30 has a semielliptical section that faces in the circumferential direction. In each of FIGS. 14 to 19, the respective sections of the left and right guide grooves 30 that face in the circumferential direction have the same shape; however, the left shape and the right shape may be different.

Sixth Embodiment

An amount of radial movement of the inner roller 11 upon which centrifugal force acts is determined by: the position of the inner periphery 32 of the guide groove 30; the position of the outer periphery 31 of the guide groove 30; the radius "a" of each roller 10; and the radius "b" of each inner roller 11. It is difficult to strictly determine a relationship among these four dimensions. Therefore, a radial clearance between the guide groove 30 and each inner roller 11 is defined. The radial clearance between the guide groove 30 and each inner roller 11 is set greater than a fit tolerance that is determined from a tolerance class H9 (Japanese Industrial Standard) for respective diameters (2×r1) and (2×r2) of the outer and inner peripheries 31 and 32 of the guide groove 30 that determine the radial groove width Δr of the guide groove 30 and a tolerance class C9 (Japanese Industrial Standard) for the diameter (2×b) of the inner roller 11.

The above configurations illustrated in the embodiments are illustrative of contents of the present disclosure, can be combined with other techniques that are publicly known, and can be partly omitted or changed without departing from the gist of the present disclosure.

The invention claimed is:
1. A bearing comprising:
an inner ring case;
an outer ring case disposed around the inner ring case;
a plurality of first rollers adapted to roll between an outer periphery of the inner ring case and an inner periphery of the outer ring case; and
a plurality of second rollers each disposed between adjacent first rollers, each of the second rollers being smaller in diameter than each of the first rollers and having a longer axial length along a rotation axis than each of the first rollers, wherein
the outer ring case includes an annular guide groove, the guide groove housing an end of each of the plurality of second rollers, with the rotation axis of each of the second rollers being perpendicular to a radial direction and a circumferential direction of the bearing,
a groove width representing a length of the guide groove along the radial direction of the bearing is greater than a diameter of each of the second rollers, and
a first radius representing a distance from a bearing axis to an inner wall face of the guide groove that is a radially outermost wall face of the guide groove in the radial direction of the bearing is smaller than a distance from the bearing axis to an axial center of the first roller plus a radius of the second roller, wherein
the radius of the second roller is greater than a first value and less than a second value, wherein the first value is defined as a size of the radius of the second roller that is set such that the first rollers are in contact with each other and the second roller is contacting with adjacent first rollers, and the second value is defined as a size of the radius of the second roller that is set such that a triangle formed by the center of the first roller, the center of the second roller adjacent to the first roller, and the bearing axis is a right triangle, wherein
a distance from the bearing axis center to the axial center of the first roller equals to a distance from the bearing axis center to the outer periphery of the inner ring case plus a radius of the first roller, and
the outer ring case includes a hole to allow insertion of the second rollers into the guide groove from outside the outer ring case.

2. The bearing according to claim 1, wherein
a second radius representing a distance from the bearing axis to the inner wall face of the guide groove that is a radially innermost wall face of the guide groove in the radial direction of the bearing is smaller than the first radius minus a diameter of each of the second rollers and is greater than the first radius minus a distance to an external face of the outer ring case that is closer to the inner ring case.

3. The bearing according to claim 1, wherein
the guide groove includes a pair of guide grooves housing one end of each of the second rollers and an opposite end of each of the second rollers.

4. The bearing according to claim 1, wherein each of the plurality of first rollers has a cylindrical shape.

5. The bearing according to claim 1, wherein each of the plurality of second rollers has a cylindrical shape.

6. The bearing according to claim 1, wherein the guide groove is configured to prevent the second rollers from moving radially beyond the axial center of the first rollers.

7. The bearing according to claim 1, wherein the bearing is a railroad bearing, the inner ring case having an inside diameter of 70 mm, the outer ring case having a diameter of 125 mm, each of the first rollers having a diameter of 12 mm and a length of 15 mm, and the second rollers move radially outward at an orbital speed of 15.14 rad/s or greater.

8. A bearing comprising:
an inner ring case;
an outer ring case disposed around the inner ring case;
a plurality of first rollers adapted to roll between an outer periphery of the inner ring case and an inner periphery of the outer ring case; and
a plurality of second rollers each disposed between adjacent first rollers, each of the second rollers being smaller in diameter than each of the first rollers and having a longer axial length along a rotation axis than each of the first rollers, wherein
the outer ring case includes an annular guide groove, the guide groove housing an end of each of the plurality of second rollers, with the rotation axis of each of the second rollers being perpendicular to a radial direction and a circumferential direction of the bearing, a groove width representing a length of the guide groove along the radial direction of the bearing is greater than a diameter of each of the second rollers, and a first radius representing a distance from a bearing axis to an inner wall face of the guide groove that is a radially outermost wall face of the guide groove in the radial direction of the bearing is smaller than a distance from the bearing axis to an axial center of the first roller plus a radius of the second roller, wherein the guide groove houses only one of a plurality of the ends of each of the second rollers, wherein a distance from the bearing axis center to the axial center of the first roller equals to a distance from the bearing axis center to the outer periphery of the inner ring case plus a radius of the first roller, and the outer ring case includes a hole to allow insertion of the second rollers into the guide groove from outside the outer ring case.

9. The bearing according to claim 8, wherein a second radius representing a distance from the bearing axis to the inner wall face of the guide groove that is a radially innermost wall face of the guide groove in the radial direction of the bearing is smaller than the first radius minus a diameter of each of the second rollers and is greater than the first radius minus a distance to an external face of the outer ring case that is closer to the inner ring case.

10. The bearing according to claim 8, wherein each of the plurality of first rollers has a cylindrical shape, and each of the plurality of second rollers has a cylindrical shape.

11. The bearing according to claim 8, wherein the guide groove is configured to prevent the second rollers from moving radially beyond the axial center of the first rollers.

12. A bearing comprising:

an inner ring case;

an outer ring case disposed around the inner ring case;

a plurality of first rollers adapted to roll between an outer periphery of the inner ring case and an inner periphery of the outer ring case; and a plurality of second rollers each disposed between adjacent first rollers, each of the second rollers being smaller in diameter than each of the first rollers and having a longer axial length along a rotation axis than each of the first rollers, wherein the outer ring case includes an annular guide groove, the guide groove housing an end of each of the plurality of second rollers, with the rotation axis of each of the second rollers being perpendicular to a radial direction and a circumferential direction of the bearing, a groove width representing a length of the guide groove along the radial direction of the bearing is greater than a diameter of each of the second rollers, and a first radius representing a distance from a bearing axis to an inner wall face of the guide groove that is a radially outermost wall face of the guide groove in the radial direction of the bearing is smaller than a distance from the bearing axis to an axial center of the first roller plus a radius of the second roller, wherein when a radius of each of the second rollers is "b", the radius "b" satisfies the following formula:

$$L^2+(R2+H)^2-2L(R2+H))/2(a+L-R2-H)<b \leq (a+R2)\cos(\pi/n)-(H+R2)$$

wherein "a" is a radius of each of the first rollers, L is a distance between a contact point where the first rollers contact each other and the bearing axis and wherein $L=\sqrt{((R2+a)^2-a^2)}$, R2 is a distance from the bearing axis to the outer periphery of the inner ring case, H is a distance between the outer periphery of the inner ring case and an inner periphery of the guide groove, and "n" is a number of second rollers, wherein a distance from the bearing axis center to the axial center of the first roller equals to a distance from the bearing axis center to the outer periphery of the inner ring case plus a radius of the first roller, and the outer ring case includes a hole to allow insertion of the second rollers into the guide groove from outside the outer ring case.

13. The bearing according to claim 12, wherein a second radius representing a distance from the bearing axis to the inner wall face of the guide groove that is a radially innermost wall face of the guide groove in the radial direction of the bearing is smaller than the first radius minus a diameter of each of the second rollers and is greater than the first radius minus a distance to an external face of the outer ring case that is closer to the inner ring case.

14. The bearing according to claim 12, wherein the guide groove includes a pair of guide grooves housing one end of each of the second rollers and an opposite end of each of the second rollers.

15. The bearing according to claim 12, wherein each of the plurality of first rollers has a cylindrical shape, and each of the plurality of second rollers has a cylindrical shape.

16. The bearing according to claim 12, wherein the guide groove is configured to prevent the second rollers from moving radially beyond the axial center of the first rollers.

* * * * *